June 12, 1928.  R. R. TWEED  1,673,650
HORSESHOE
Filed Sept. 9, 1927
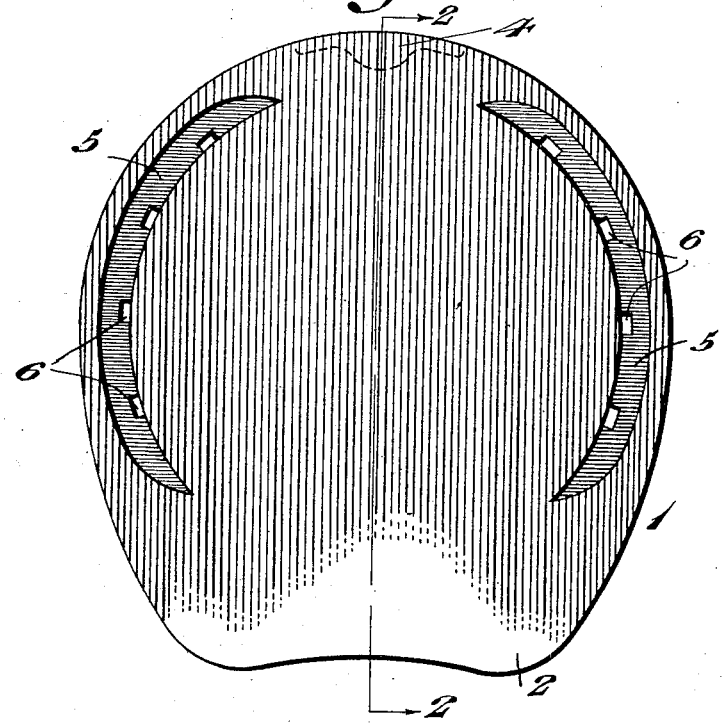
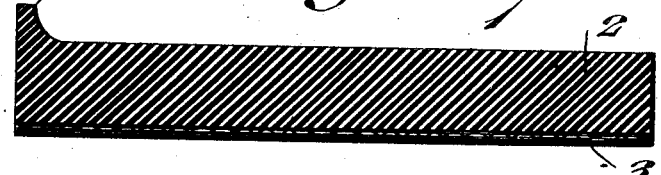
INVENTOR:
Robert R. Tweed,
BY
ATTORNEYS.

Patented June 12, 1928.

1,673,650

UNITED STATES PATENT OFFICE.

ROBERT R. TWEED, OF AUDUBON, NEW JERSEY.

HORSESHOE.

Application filed September 9, 1927. Serial No. 218,430.

My invention relates to a new and useful non-metallic horseshoe, and more particularly to a novel horseshoe construction which will afford a soft tread and a firm grip, thus adding to the comfort of the animal and preventing slipping.

My invention further relates to a new and useful horseshoe which will afford complete protection for the entire bottom or under side of the hoof, thus not only to protect the rim or periphery of the horny part of the hoof, but also to cover and protect the tender, sensitive members located in the cavity or rear recessed portion of the hoof, such as what is commonly known as the frog; and to prevent dirt, mud, snow or stones from collecting in this cavity or recess, which is admittedly injurious.

To the above ends my invention consists of a horseshoe made out of a relatively soft or flexible material such as hard canvas, rubber, or the like, or a mixture of such material such as hard canvas and rubber mascerated and molded together, which will act as a shock absorber to alleviate the jar resulting from the impact of the hoof with hard pavements commonly prevailing in cities and improved highways.

My invention further consists of a non-metallic horseshoe of this general character which will cover the entire under side of the hoof, thereby adequately protecting the frog and other tender and sensitive parts of the foot and which will prevent the accumulation of dirt therein.

My invention further consists of a horseshoe of the character stated having a gripping or frictional under side or surface to guard against slipping when the road is covered with snow, slush mud, or other slimy or slippery substances, thereby also adding to the traction capacity of the animal without a corresponding increase in the energy exerted.

My invention further consists of the various features of construction and advantage hereinafter described and claimed.

For the purpose of illustrating my invention, I have shown in the accompanying drawings, a form thereof which is at present preferred by me, since it will give, in practice, satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings:—

Fig. 1 represents a bottom plan view of a horseshoe embodying my invention,

Fig. 2 represents a section on line 2—2 of Fig. 1, and

Fig. 3 represents a similar sectional view of a modified construction.

Referring to the drawings, in which like reference characters designate like parts, 1 designates a non-metallic horseshoe construction embodying my invention, comprising a pad 2, composed of some relatively hard but resilient material such as rubber, fiber, brake lining, or the like, or commingled rubber and fibrous or textile material, and a bottom layer or cover 3, made of canvas or other tough, rough, textile material. 4 designates the toe-calk and 5 designates recesses or grooves provided with the holes 6 through which the nails fastening the shoe to the hoof are adapted to pass.

In Fig. 3 I have shown a modified construction wherein I employ alternate layers of canvas and rubber 7 and 8 respectively, to form the pad 2 of the horseshoe 1, care being taken to have the lowermost or underside layer made of canvas or its equivalent, since the same effects a more efficient gripping of the roadbed and thus not only improves the traction capacity of the animal but also prevents slipping.

It will thus be apparent that my invention comprehends a solid pad of rubber having a canvas bottom layer or layers cemented thereto as seen in Fig. 2, or the layers of canvas and intermediate rubber sheets or layers may be three or four or more in number as in Fig. 3. If desired, the canvas and rubber may be ground up together and molded to the desired shape and size, it being however essential that the bottom of the shoe be slightly roughened or provided with a bottom layer of rough canvas or similar fabric or textile covering to prevent slipping.

It will also be understood that while I have specified rubber, canvas, and brake lining, or a combination thereof, for making my novel horseshoe, still it is within the scope of my invention to employ any material or combination of materials which will combine the proper degree of toughness and resiliency, and at the same time furnish a relatively rough or gripping bottom surface for frictional engagement with the road, said horseshoe being of such size and contour as to cover and protect the entire under side of the hoof, as will be apparent from Fig. 1.

It will now be apparent that I have devised a novel and useful horseshoe which embodies all the features of advantage enumerated as desirable in the statement of the invention and the above description; and while I have, in the accompanying drawings, shown and described a preferred embodiment thereof, which is at present preferred by me since it will give in practice satisfactory and reliable results, it is to be understood that such embodiment is susceptible of modification in various particulars without departing from the spirit or scope of my invention or sacrificing any of its advantages.

Having thus described my invention, what I claim as new and desire to secure by Letters Patent is:—

A non-metallic horseshoe of the character stated, comprising a solid pad made of alternate layers of hard rubber and canvas vulcanized together to cover the entire underside of a horse's hoof, the lowermost of said layers being made of non-slipping material.

ROBERT R. TWEED.